O. M. EDWARDS.
WINDOW.
APPLICATION FILED JUNE 8, 1905.
1,077,875.
Patented Nov. 4, 1913.
4 SHEETS—SHEET 4.
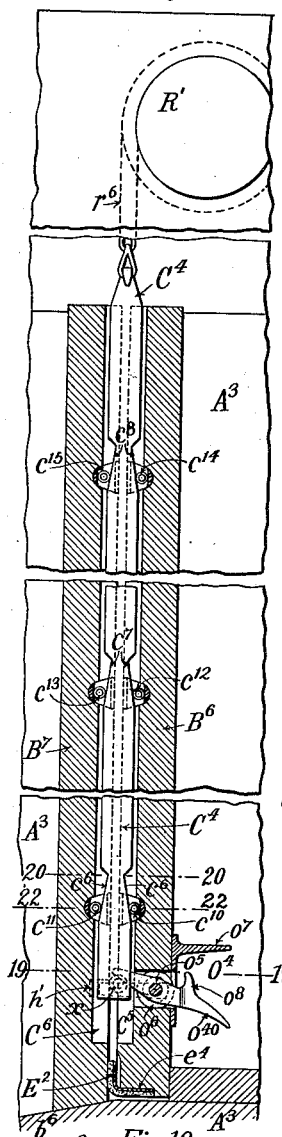
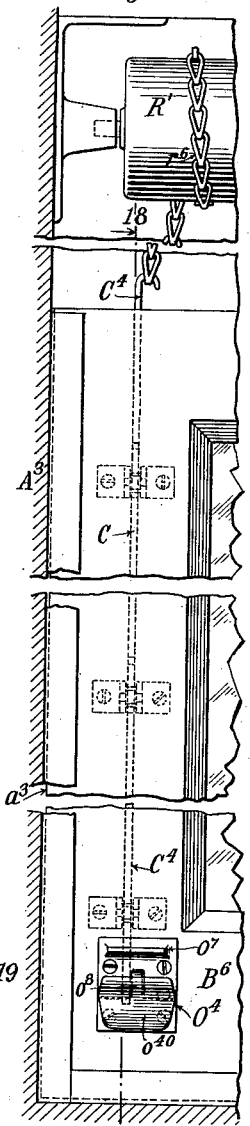
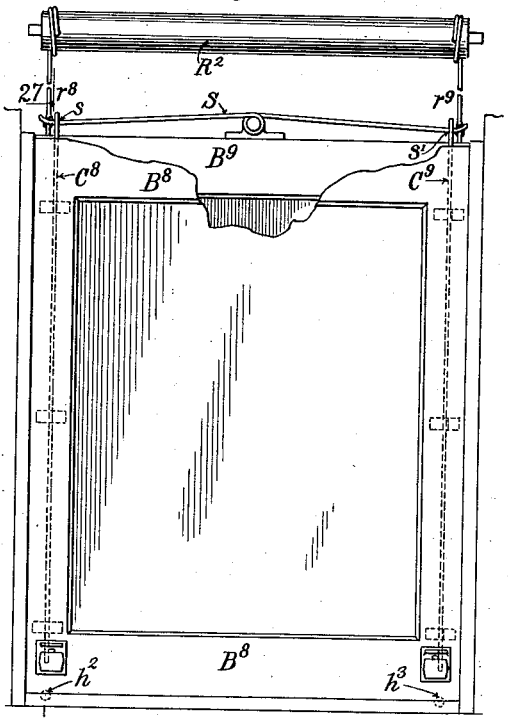
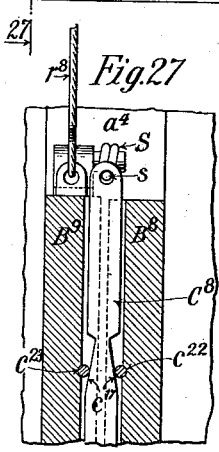
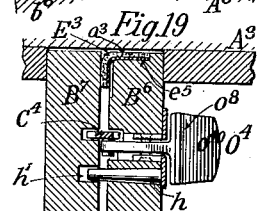
Inventor
Oliver M. Edwards

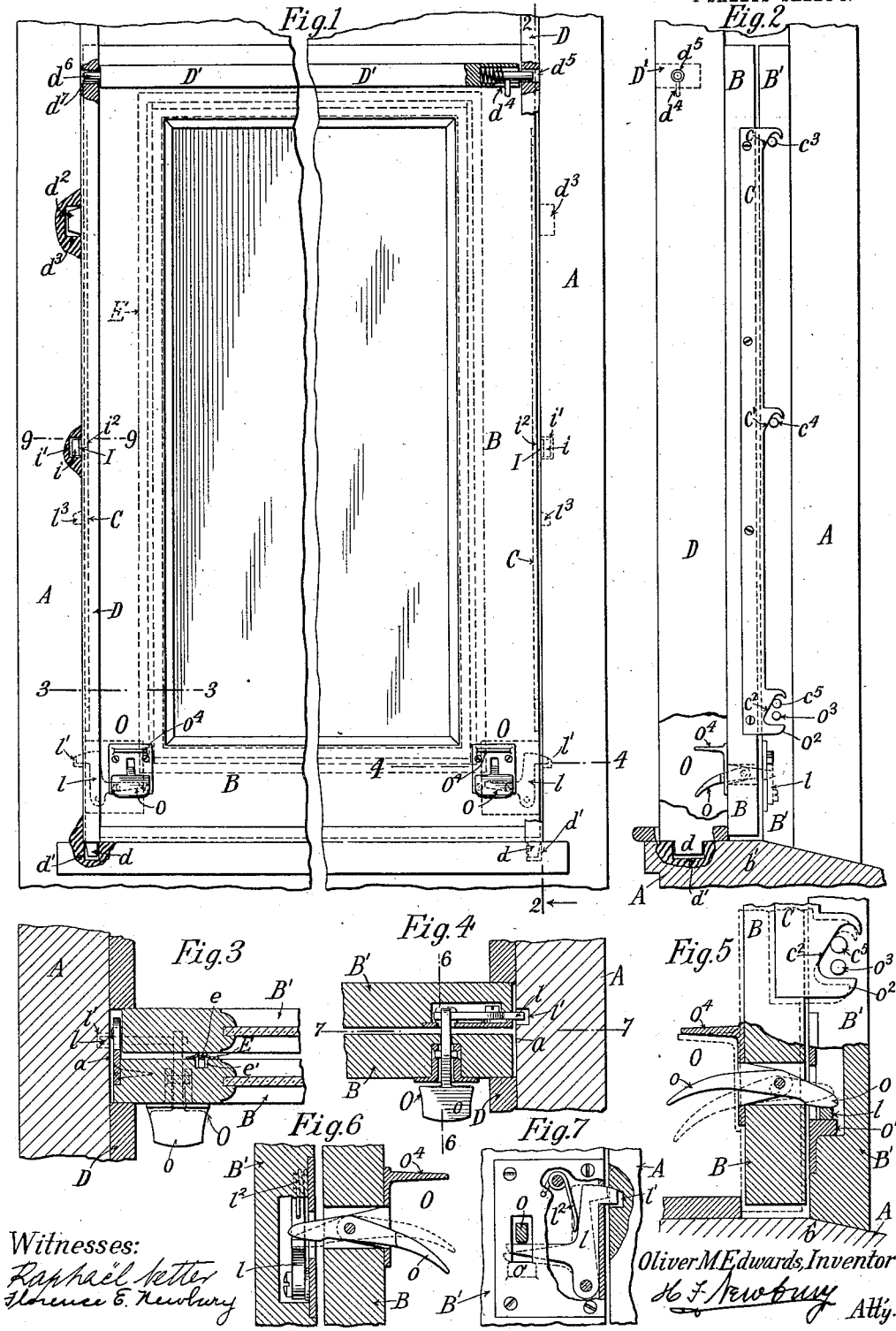

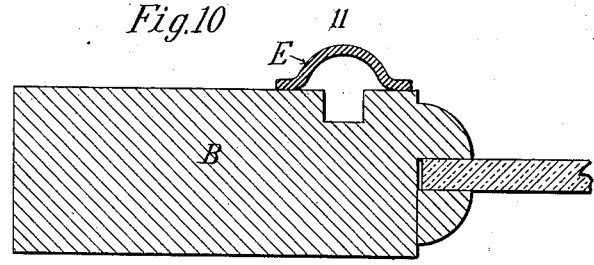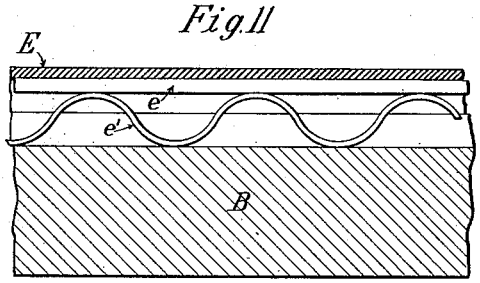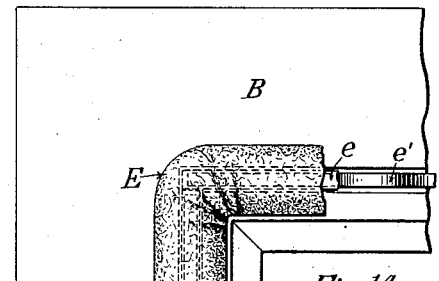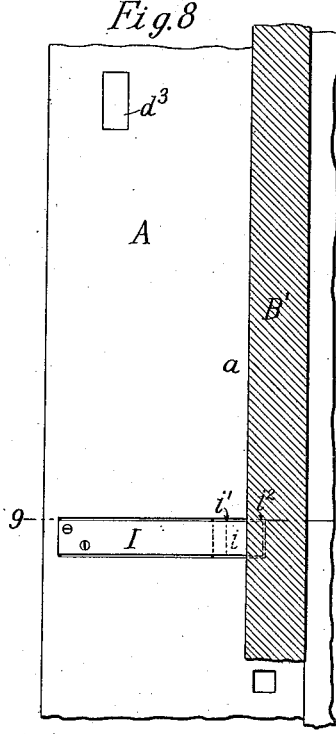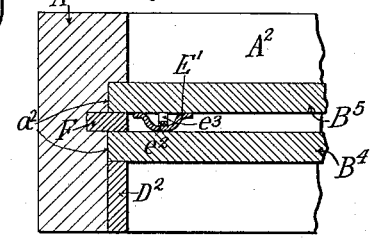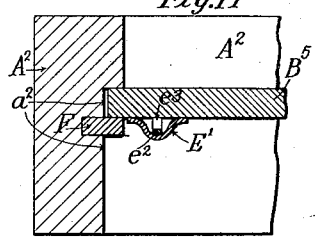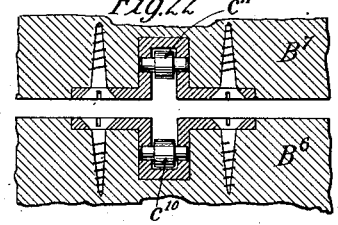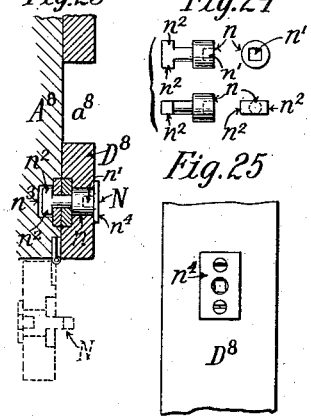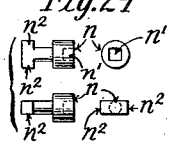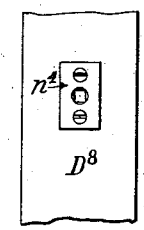

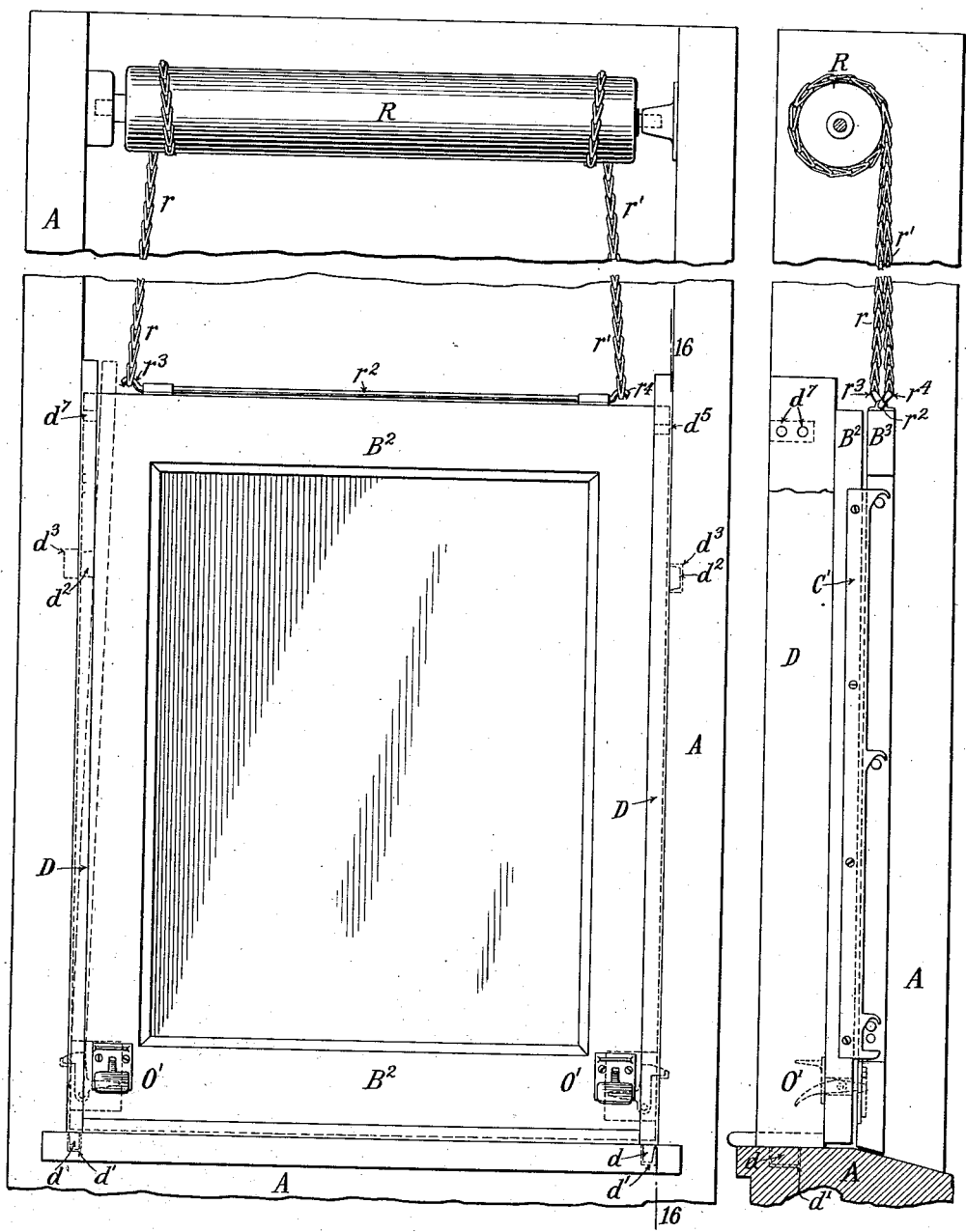

UNITED STATES PATENT OFFICE.

OLIVER M. EDWARDS, OF SYRACUSE, NEW YORK.

WINDOW.

1,077,875.  Specification of Letters Patent.  Patented Nov. 4, 1913.

Application filed June 8, 1905. Serial No. 264,300.

*To all whom it may concern:*

Be it known that I, OLIVER M. EDWARDS, a citizen of the United States, residing at Syracuse, county of Onondaga, State of New York, have invented certain new and useful Improvements in Windows, of which the following is a full, clear, and exact description, reference being had to the drawings accompanying the same.
This invention relates generally to "double sash" windows and the manner of combining the two sashes with the window frame and with one another. "Double sash" windows are in quite extensive use in different classes of railway cars, as for instance parlor, sleeping and dining cars and as thus used have one window sash arranged in front of the other with a space between the two sashes, each sash having its guideway, it being movable therein to open and close the window the same as is common with windows having a single sash.

The invention has for one of its objects to provide means by which one sash is supported in the guideway and supports or carries the other sash therein, as the two move to open and close the window, and one is movable relatively to the other to hold them in contact with the guideway and to release them from such holding contact.

Another object is to provide means by which one sash is made movable relatively to the other to firmly hold both in the guideway and to release them from such holding action.

Another object is to provide means by which the two sashes are connected together so as to move substantially as a single sash moves in opening and closing the window and also to permit one sash to move relatively to the other to hold and release both sashes.

Another object is to provide means by which the sashes are connected together, permitted to be moved, one relatively to the other, and more or less counterbalanced in opening and closing the window.

Another object is to provide means by which one sash is made to move both sashes into contact with the guideway.

Another object is to provide means by which one sash is held in the guideway and the other is permitted to be detached or removed therefrom and the glasses of both sashes are readily accessible for cleaning &c.

Another object is to provide means by which the sashes are connected together to move substantially as a single sash moves in opening and closing the window and one sash is readily detachable from the other when unconfined by the guideway.

Another object is to provide means by which the sashes are connected together and locked in the closed position by a detent or detents mounted on one of such sashes.

Another object is to provide means by which one sash is moved relatively to the other to hold both in contact with the guideway and to release the same therefrom and the sashes are connected together and provide a support against which gravity or other force may act to move both sashes into contact with the guideway.

Another object is to provide means normally acting to force both sashes into contact with the guideway, a support against which means may act and means adapted to overcome such normally acting means and release the sashes from holding contact with the guideway.

Another object is to provide means by which one sash is moved relatively to the other and moves a locking detent mounted upon one of the sashes to unlock the same and then move both sashes in the guideway.

Another object is to provide means by which the sashes are connected together and one is detachable from the other when unrestrained by the guideway.

Another object is to provide wedge and coacting surfaces one of which is movable relatively to the other in one direction to force one sash away from the other and into contact with the guideway.

Another object is to provide a guideway in which sashes may move and be held, a portion or portions of which is movable to remove one sash and means adapted to hold and release the movable portion or portions of the guideway.

Another object is to provide a guideway in which sashes may move and be held with a movable portion or portions to permit of the removal of one or more of the sashes, means adapted to hold and release the movable portion or portions of the guideway and means adapted to hold one sash in the guideway against displacement therefrom.

Another object is to provide a guideway in which two sashes may move and be held and which is provided with a movable portion or portions to permit of the removal of one sash and automatically acting means adapted to hold the other sash in place when such one is removed from the guideway.

Another object is to provide means to yieldingly connect or contact with both sashes, a portion or portions of which are porous and adapted to admit of a limited and restricted passage of air therethrough into and from the space between the sashes.

Another object is to provide means adapted to connect or contact with both sashes and thereby more or less confine the air within the space between the sashes and exclude dirt therefrom.

Another object is to provide means connecting or contacting with both sashes and adapted to exclude dirt from the space between the sashes and move them, one relatively to the other, in opening and closing the window.

Another object is to provide dirt excluding and air confining means in engagement with both sashes and adapted to maintain such engagement or contact as the sashes are moved to open and close the window.

Other objects will appear from the descriptions hereinafter given; and my invention consists in the combinations of parts or devices hereinafter set forth and particularly pointed out in the claims hereunto annexed, which form a part of this specification.

Figure 1 shows in front elevation, with the vertical central and some other portions broken away, one embodiment of my invention. Fig. 2 shows in vertical section, on line 2—2 of Fig. 1, looking from right to left that which is seen in Fig. 1. Fig. 3 is a partial cross sectional view, on line 3—3 at the left of Fig. 1, of the parts there seen. Fig. 4 is a partial cross sectional view on line 4—4, at the right of Fig. 1, of the parts there seen. Fig. 5 shows on an enlarged scale and with portions broken away that which is seen in the lower portion of Fig. 2. Fig. 6 is a vertical sectional view, on line 6—6 of Fig. 4, of the parts there seen. Fig. 7 is a view in front elevation on line 7—7 of Fig. 4, of the locking device attached, at the lower right hand corner of Fig. 1, to the outside sash, as seen in Figs. 1, 2, 4 and 6. Fig. 8 shows in elevation and on an enlarged scale a portion of the left hand side of the window frame seen in Fig. 1 when looking from right to the left and with the casing and one sash removed. Fig. 9 is a cross sectional view on line 9—9 of Figs. 1 and 8. Fig. 10 shows in partial cross section a portion of one of the double sashes on an enlarged scale that are seen in Figs. 1 and 3 and illustrates the application of the dirt excluding and air confining means to such sash as the same are shown on Figs. 1 and 3. Fig. 11 shows on an enlarged scale, with the sash and a portion of these same means in section and the flexible bar and spring of such means in elevation, as the same would be seen on line 11—11 of Fig. 10. Fig. 12 shows one corner portion of the sash seen in Fig. 1 illustrating the application of these dirt excluding and air confining means to the sash, as seen when the sash is turned half way around, so as to bring the rear side, as seen in Figs. 1 and 3, to the front. Figs. 13 and 14 show in cross section a somewhat modified manner of applying these dirt excluding and air confining means to yieldingly bear against one sash when attached to the other one with modified means of holding one sash in the guideway when the other is removed therefrom. Fig. 15 shows in front elevation portions of that which is seen in Figs. 1 to 7, but with counterbalancing or automatic-raising means applied to one of the sashes, so as to more or less counter or overbalance both sashes and support the sash to which such means is attached. Fig. 16 shows in vertical section, on line 16—16 of Fig. 15, that which is there seen. Fig. 17 shows one side portion of a window frame and sash in front elevation, with portions broken away, and it illustrates another embodiment of my invention. Fig. 18 shows in vertical section on line 18—18, looking from left to right, that which is seen in Fig. 10. Fig. 19 shows in cross section on line 19—19 of Fig. 18 that which is there shown. Fig. 20 shows in cross section on line 20—20 of Fig. 18 the parts as there shown. Fig. 21 shows on an enlarged scale a portion of the sash and the operating means, seen in Fig. 19, with a portion of one form of dirt-excluding and air confining means applied to such operating means. Fig. 22 shows on an enlarged scale in cross section on line 22—22 of Fig. 18, the manner of attaching roller surfaces to the two sashes for twin inclined surfaces or wedges to coact with to move the sashes apart or to move one relatively to the other. Fig. 23 shows in cross section a modified form of casing for the window and means by which it may be held in place and be moved therefrom to permit one of the sashes to be removed and be replaced in the guideway. Figs. 24 and 25 show details of that which is seen in Fig. 23. Fig. 26 shows in front elevation another embodiment of my invention. Fig. 27 shows in vertical section on line 27—27 of Fig. 26 that which is there seen. Fig. 28 shows a modified form of sashes moving and connecting means.

In Figs. 1 to 12, inclusive, one embodiment of my invention is illustrated. As there shown A represents the frame of the window wherein double sash, as B and B' are mounted, one in front of the other, and are so connected as to move up and down in the guideway a, which, as there shown, is common to both sashes, and open and close the window. The two sashes B and B' move in the guideway substantially as a single sash moves for this purpose. These sashes when unrestrained by frictional contact move freely in the guideway, but when forced into contact with some portion or portions of the guideway they are held firmly in contact therewith in proportion to the force with which they are moved and held in such contact. As here shown the sash B' rests upon the sill or lower portion $b'$ of the window frame A and this sash is thereby supported, except when lifted away from such sill in opening the window. The sash B is connected with sash B', so that the two move substantially as one sash would move in the guideway and sash B is practically supported by its connection with sash B' and in such a manner that gravity constantly acts thereon to move the two sashes away from one another and into contact with opposite portions of the guideway in which they move. As is clearly seen in Figs. 2 and 5 sash B does not touch the sill $b'$ when the window is closed and it is supported by the inclined or wedging surfaces, as $c$, $c'$ and $c^2$ formed on the bar C attached to the sash B engaging with and resting upon the surfaces or studs, as $c^3$, $c^4$ and $c^5$, attached to sash B' and the friction of sash B upon the portion of the guideway $a$ with which it contacts. As here shown a bar C with the inclined or wedge surfaces, as $c$, $c'$ and $c^2$ and the coacting surfaces or studs, as $c^3$, $c^4$ and $c^5$ may be substantial duplicates at each edge of the sashes or at or near those portions of the guideway with which the sashes engage and by which they are confined. As thus shown the sashes B and B' are moved to substantially an equal extent and those portions which engage with the guideway, with these bars C and the inclined or wedge surfaces as $c$, $c'$ and $c^2$ and coacting surfaces or studs, as $c^3$, $c^4$ and $c^5$, serve as holding devices or means to firmly hold the sashes in the guideway. These inclined or wedging surfaces $c$, $c'$ and $c^2$ coact with the surfaces or studs $c^3$, $c^4$ and $c^5$ and, as here shown, cause gravity to act on sash B to move one sash relatively to the other in the guideway and force both sashes into contact therewith. From this it will be seen that the sashes B and B' have two movements in the guideway, one to open and close the window and the other to move one sash relatively to the other to bring both sashes into firm contact with the guideway and release them from such contact. It will also be seen that the guideway confines the sashes in a direction transverse to the direction of the movement of the sashes in opening and closing the window and also that the force with which both sashes are forced into contact with the guideway is in proportion to the weight of sash B.

To release the sashes from the holding action of their contact with the guideway sash B has to be moved relatively to sash B' in the reverse order in which the two were moved to bring them into firm contact therewith. This is accomplished, as herein shown, by means of operating devices, as O, preferably one at each edge portion of sash B, portions of which are made to engage with portions of sash B', so that the weight of sash B may be overcome, and when this is done, further and continued force applied to such devices lifts both sashes and they move in the guideway, after the manner a single sash moves, until the window is opened to the desired extent, where they may be held by any suitable means. These operating means O are preferably arranged at or near opposite edges of the window, as seen in Fig. 1, so that both hands of the operator may be used in opening and closing the window. As thus shown a lever $o$ is pivoted in any suitable manner to sash B, which lever extends through sash B and enters a recess in sash B' and engages with such sash at $o'$ through one end of sash locking lever $l$, which is preferably interposed between one end of this lever $o$ and the point $o'$ in sash B', as is more clearly seen in Figs. 2 and 7. These operating means may also be substantial duplicates, the only difference being that one is what is known as "right hand" and the other as "left hand" so as to have the arms of the bent or elbow levers $l$ extend in opposite directions to engage with suitable recesses, as $l'$, in the guideway, as shown in Figs. 1 and 7. These bent or elbow levers, as $l$, in connection with the pivoted levers, as $o$, and springs, as $l^2$, Fig. 7 constitute one form of locking or holding means by which the sashes may be locked in the closed position, or in any desired open position or positions. As seen in Fig. 1 recesses, as $l^3$, may be formed at desired places in the guideway with which the locking levers or detents, as $l$, may engage and hold the sashes in the open position. These springs, as $l^2$, not only tend to hold the locking levers or detents, as $l$, in the locking position, but also by reason of the location of one end of each of these levers between the pivoted levers, as $o$, and the points, as $o'$, in sash B' tend to hold such levers, as $o$, in the position seen in dotted lines in Fig. 5 and in full lines, as seen in Fig. 6.

When the sashes, as B and B', are to be moved to open the window it is desirable that they shall be so connected that force applied to the operating means, as O, shall cause the force thus applied to act on both. This may be done in any desired way. One way in which this result may be accomplished is seen quite clearly in Figs. 2 and 5 where the projections, as $o^2$, on bars, as C, engage with studs, as $o^3$, on sash B' and limit the extent of movement of sash B in regard to sash B', when they are moved in a direction to open the window.

To aid in operating the levers, as o, in opening the window, thumb pieces, as $o^4$, may be employed, if desired. They may be arranged as shown, or in any other convenient manner desired.

When the wedging and coacting surfaces, as $c$, $c'$, $c^2$, $c^3$, $c^4$ and $c^5$, are constructed and arranged, as here shown, the sash B may be detached from sash B', when the casings, as D, which help to make up the guideway $a$ are moved so as to no longer tend to confine the sashes or limit the extent they may move, relatively to one another, transversely to the length of the guideway.

In double sash windows where each sash is entirely independent of the other in opening and closing the window, one sash may be moved to give access to the other for the purpose of cleaning the glasses or making repairs, if the extent of movement of each of the sashes is sufficient in its guideway to permit of this being done. As such windows are usually constructed the extent of such movement of the independent sashes is not sufficient to give full access to each sash, and hence the sashes have to be some little distance apart in order to introduce appliances between the sashes to clean the interior surfaces of the glasses of such sashes.

In order to provide a convenient means of cleaning the glasses of my improved window the casings, as D D, are as here shown, preferably made removable so as to permit of the sash B being readily detached from sash B' and removed from the guideway, when the remaining sash may be thoroughly cleaned, by reason of free access being given thereto, the same as if but a single sash was used; and the detached and removed sash, B, may also be cleaned and returned to the guideway and readily connected with the sash that remained therein with the expenditure of but little labor or time and with a beneficial result. This is accomplished, as shown, by forming on the lower end of each of the casings D a tenon $d$ to enter a recess $d'$ in the bottom portion of the frame A, as indicated in Fig. 2 and at the right and left of Fig. 1, and then providing a suitable projection or lug, as $d^2$, on each casing to enter a suitable recess, as $d^3$, in the window frame, as seen in Figs. 1 and 8. When thus constructed the casings D can be readily removed by moving the top portion toward the center of the window for a sufficient distance to enable the lug $d^2$ to leave the recess $d^3$, as indicated in dotted lines in Fig. 15, and then by lifting the tenon $d$ out of the recess $d'$. The casings can be replaced by entering the tenon $d$ in the recess $d'$ and entering the lug $d^2$ in the recess $d^3$ and forcing the casing into place.

To lock or hold the casings D D in place any desirable means may be employed. One such means is shown in Fig. 1 where the upper portion D' of the trim of the window is made removable and is held in place by two dowel pins and a spring catch. The ends of this portion D' abut against the casings D D and prevent their moving toward the center of the window until such portion is removed, when the casings are readily moved, as above explained, and the sash, as B, detached and removed. As shown the spring catch, as $d^4$, is arranged at one end of portion D' and it engages with a recess, as $d^5$, in the casing D against which the end of such portion carrying such catch abuts. The opposite end of this portion, as D', is provided with two dowel pins, as $d^6$, which engage in recesses, as $d^7$, in the casing with which that end of such portion abuts, as is clearly seen in Fig. 1 where a part of each end of such portion and the adjacent parts of the casings are broken away to show the catch and dowel pins in engagement with their recesses, only one of the dowel pins being seen. The recesses, as $d^7$, for the dowel pins are clearly seen in Fig. 16, where one of the casings is broken away to clearly show such recesses. These recesses are also indicated in Fig. 15, as is also the recess, as $d^5$, for the spring catch, as $d^4$.

Instead of having the casings removable, as shown in preceding figures, they may be made movable in any desired manner that will permit of the ready removal of one of the sashes, as for instance, as seen in Figs. 23, 24 and 25, where the side casings as $D^8$ are hinged to the window frame, as $A^8$ adjacent to the guideway as $a^8$, so as to move from the position seen in full lines in Fig. 23 to that seen in dotted lines. As thus seen casing $D^8$ is provided with a holding or locking device, as N, by which it may be secured in the position seen in full lines in Fig. 23. This locking device N consists of a movable detent $n$, which is rotatably mounted in the casing and provided with an enlarged or head portion having a cavity, as $n'$, to receive a key or tool by which the detent may be partially rotated in its mounting in the casing. This detent, as $n$, is made with projecting portions, as $n^2$, which are made as indicated in Fig. 24, where this detent is shown in two different positions, the first of which shows these projecting portions as extending in opposite directions up and down and the second of which shows these projections when detent $n$ is turned one quarter around from that seen in the first position. When this detent $n$ is in the position seen in dotted lines in Fig. 23 it can enter a recess, as $n^3$, in the frame, as $A^8$, and of substantially the shape therein shown, and when once thus entered the detent can be readily turned or rotated about one fourth of a revolution and brought from the position seen in dotted lines in Fig. 23 to that seen in full lines, when the casing will be locked in position until it is desired to remove one of the sashes, when by simply turning detents, as $n$, from the position seen in Fig. 23 in full lines to that seen in dotted lines the casings are free to be moved from the position seen in full lines to that seen in dotted lines and the sash can then be readily detached and removed for cleaning or other purposes. These detents may be partially rotated by a tool or key having a suitably shaped portion to enter the recess, as $n'$, on being passed through the opening in plates, as $n^4$, fixedly attached to casings, as $D^8$, over the recesses, as $n'$, in detents, as $n$, in a well known manner.

In double sash windows it is desirable to keep the space between the two glasses free from the dust that will float in or be carried by the air and settle upon or adhere to the adjacent surfaces and hence it is not only desirable to have the sash frames in firm contact with the guideway, so as to exclude dirt and dust at these points from this space, but it is also desirable to further exclude such dust and dirt as possibly may enter such space past the edges of the sash and guideway. This is accomplished by placing between the sash frames an excluding diaphragm, as it were to serve as dirt excluding and air confining means, so arranged that the two sashes may move one relatively to the other, sufficiently for bringing them into contact with the guideway and releasing them from such contact in opening and closing the window. This requires that such diaphragm or means shall be flexible or in yielding contact with one or both of the sashes, so as to further inclose the immediate space between the two glasses and maintain excluding and confining contact between the sashes. Different means may be employed. As here shown a slightly porous material is used and it is firmly secured to one sash and is yieldingly held in contact with the other. Preferably a continuous strip of such material, as for instance a thin strip of felt or other slightly porous material, as E, is secured at its edges to sash B in close and intimate contact therewith by any suitable means, as glue or other desired means, but preferably with such edges sufficiently near to each to leave quite a space between such strip and the sash along its central portion, as shown in Figs. 3 and 10, where a portion of the sash, (recessed to receive a spring,) with the porous material attached thereto are seen in cross section. As thus seen the strip E is arranged so that its central portion may be yieldingly held in contact with the inner surface of the frame of the sash B', so that such portion may move with sash B', as such sash moves, and the edge portions of such strip may move with sash B, as it moves, and the strip acts as a loose or yielding diaphragm or means between the two sashes and excludes dust and dirt from the immediate space between the glasses and also more or less confines the air within such space, so that it may act as a "dead" air space and more or less interfere with the conduction of heat or cold through the glasses. The central portion, (considered in cross section,) of the strip E may be yieldingly held in contact with sash B' by any suitable means, one form being shown, and it consists of a more or less flexible narrow strip or bar of metal, as $e$, arranged in contact with strip E and a second narrow bar or strip of spring material or metal, as $e'$, bent into the form seen in Fig. 11, where a portion of the sash B, strip E, bar $e$ and spring material $e'$ are seen, the sash and strip E being seen in longitudinal section and the strip $e$ and spring $e'$ in elevation. The strip E is bent at the corners, as seen in Fig. 12, where a portion of sash B and such strip are seen, as the strip is bent at one of the corners. The portion of sash B thus shown is turned around so that the parts are there seen as they appear from the rear of such sash in Figs. 1 and 3. By thus bending the strip E the material is continuous at the corners and the dust is as effectually excluded and the air as effectually confined within this space between the two glasses at these points as it is at other points, the ends of the strip being properly joined where they meet. Where the space between the sashes is no greater than that seen in Figs. 2 to 6, the sash to which the strip E is attached may be recessed to receive the bar $e$ and spring $e'$, as shown, but when the space is greater than here shown, as for instance in Figs. 13 and 14, where another form of means are shown for holding one sash in place while the other is removed as when the glasses of the sashes are to be cleaned, or it is otherwise desired to have access to the space between them, there will be no need of any recessing of the sash, as will be clearly apparent. These dirt excluding and air confining means may be such as is desired and may be applied in any desired manner, that is they may be as desired, and be such as are applied in Figs. 1 to 12, as seen in Figs. 13 and 14, as seen in Figs. 18, 19 and 20, or in any other desired form or manner, so as to do the work or serve the purpose that is done or served by the means herein specifically shown and described in the several combinations of elements particularly pointed out in the claims hereunto annexed. As shown in Figs 13 and 14 the strip of material E' is attached to the outer sash, as $B^5$, in any desired way, such for instance as is seen in Figs. 1, 3, 10, 11 and 12 or otherwise. As shown a spring, as $e^3$, and flexible bar, as $e^2$, are employed, which are arranged and serve the same purposes that are served by the corresponding bar and spring in the construction set forth in the above mentioned figures. In the form these dirt excluding and air confining means are shown in Figs. 18, 19 and 20, there is a piece of thin flexible spring material bent into angular form in cross section and applied to each edge of the sash $B^6$ in such a manner that it can yield toward the sash at the side thereof adjacent to sash $B^7$ and firmly press against the adjacent sash. This spring strip, as $e^4$ Fig. 18 and $e^5$ Figs. 19 and 20, is secured to the sash $B^6$ by any suitable means, as by small nails or otherwise, and to such strip preferably a strip of soft yielding material, as $E^2$ or $E^3$, may be secured in any desired manner so as to lie between the spring, as $e^4$ or $e^5$, and the adjacent surface of the sash $B^7$. As thus arranged the spring material, as $e^4$ or $e^5$, and the strip, as $E^2$ or $E^3$, exclude dirt and more or less confine the air, but the sashes may move to and from one another to a certain extent and yet have the strip of soft material remain in continuous contact with the adjacent sash, the meeting points of the spring strips and soft material being properly joined to permit of this movement taking place and yet maintaining such excluding and confining action at such points as at other points between the sashes.

In the construction seen in Figs. 18, 19 and 20 where the sash operating means extend through one sash to engage with the other one it is desirable to so construct such means that dirt and air will be precluded from freely passing into the space between the glasses of the two sashes. This can be done by the construction seen in Figs. 18 and 21, wherein felt washers as $o^6$ are applied to the hubs $o^5$ of the lever $o^{40}$ of the operating means $O^4$. These washers, as $o^6$, permit the levers, as $o^{40}$, to move with sufficient freedom and they preclude the free passage of dirt and air from outside sash of $B^6$ to the interior space between the glasses of the two sashes. These washers, as thus shown, contact with the sash during the movement of the levers, as $o^{40}$, in opening and closing of the window and by maintaining this contact prevent the passage of air, by which the dirt would be carried to such an extent that such dirt would be collected or arrested by the washers and prevented from entering the space between the glasses. The washers are somewhat porous, but confine the air more or less within the spaces between the glasses, as well as excluding the dirt therefrom.

In each of the forms of dirt excluding and air confining means herein shown the arrangement of the parts is such that one sash can be removed from the guideway and replaced therein without disturbing the arrangement of the different parts of such means or in any way affecting the operativeness of such means when both sashes are in the guideway, or of the operator paying any particular attention thereto in the removal and replacement of the sash. Also such means do not necessarily interfere with the cleaning of the glasses when one sash is removed from the guideway. While this is the case it is to be understood that this is the preferable arrangement and also that some other arrangement than this is within the spirit of this branch of the present invention, when the terms of the claims hereunto annexed do not specifically set forth to the contrary.

If desired one of the sashes may be otherwise supported than by the sill of the window frame, as shown in Figs. 1, 2 and 5 of the drawings, as for instance, by counterbalancing or automatic-raising means, as seen in Figs. 15 and 16, wherein substantially the same construction is illustrated as is seen in the preceding Figs. 1, 2 and 5, except that such means are added to what is there shown. As here seen the sash $B^3$, Fig. 16, which corresponds with sash $B'$ of the preceding figures, is connected with a spring roller R by chains $r$ and $r'$. One end of each of these chains is attached to the roller R and the other end of each chain is attached to an equalizing device $r^2$ consisting of a rock shaft secured to the sash $B^3$ so that it may turn in its bearings and be provided at each end with an arm, as $r^3$ and $r^4$, which arms are arranged preferably at an angle of about 90 degrees to each other on the rock shaft. This rock shaft equalizes the force of the spring in roller R exerted on all parts of the sash, so that all portions may move without a cramping action in the guideway. Any other means may be employed to connect the roller R to the sash $B^3$ as the rock shaft and chains do not constitute any necessary part of the present invention, other than forming one illustration of suitable means that may be employed for this purpose. Also any other form of counterbalancing or automatic-raising means may be employed, if desired, because the combinations of elements or devices herein described and particularly pointed out in the claims hereunto annexed do not necessarily depend on the specific form of counterbalancing or automatic raising means and the manner of connecting the same to sash $B^3$ herein shown and described. As here shown sash $B^3$ may be wholly supported by the roller R and the tension of the spring of this roller may be such as to also wholly support the weight of sash $B^2$, so that whenever the means, by which the sashes are held in the closed position, are moved to release them both sashes may immediately move in the opening direction under the stress of this spring. When the window is to be closed the stress of this spring has to be overcome, the same as in automatic opening windows now quite extensively used in railway cars. Sash B² is provided with a bar, as C', similar to bar C in Fig. 2, which is provided with similar inclined or wedge surfaces which engage with studs or surfaces attached to sash B³ the same as is the case in preceding figures of the drawings, so that sash B² is connected with sash B³ and is supported thereby the same as sash B is connected with and supported by sash B', hence the means by which this is accomplished is in substance the same in both cases and a more detailed description is not thought necessary at this point. Similar operating and locking means are employed in connection with sashes B² and B³ that are used in connection with sashes B and B'. As sashes B² and B³ may be automatically raised to open the window and be supported by the means by which they are moved in the opening direction they have to be locked in the closed position in order to keep the window closed. The form of means used in connection with sashes B and B' are well adapted for this purpose, as when the sash B³ abuts with the sill of the window frame the operator releases the pivoted levers, while still pressing down on the thumb or hand pieces and allows the locking detent to spring into locking position, when both sashes are locked in the closed position as a single sash is locked, when automatic raising means are employed. These locking means in the case of sashes B² and B³, as in the sashes B and B', are operated in the unlocking direction by the hands of the person opening the window through the medium of operating means, as O', O', which are similar to the operating devices, as O, O, seen in Figs. 1 to 7 inclusive heretofore described, and therefore, the construction and operation of the same will be understood.

In Figs. 15 and 16 the casings D, D, are removable the same as in preceding figures. At the left of Fig. 15 the casing D is shown in full lines in position as when in place and it is shown in dotted lines when it has been moved toward the center of the window sufficiently for the lug or projection, as $d^2$, to be wholly withdrawn from its recess, as $d^3$, and is free to be lifted so as to lift its tenon, as $d$, out of its recess, as $d'$, as before explained. In this Fig. 15 the removable part of the trim of the window, as D', is omitted, but the recesses to receive the dowel pins and spring catch are shown in dotted lines, the recesses, as $d^7$, for the dowel pins are shown in full lines in Fig. 16, where one of the casings is broken away near its upper end to permit of this being done.

If desired automatically or other operating holding devices may be employed in holding one sash in its guideway when the casings, as D D, have been removed as shown in Figs. 1, 2 and 15, or have been moved out of holding position, as indicated in Fig. 23 in dotted lines. One form of such means is illustrated in Figs. 1, 8 and 9 wherein a spring bar I is secured at one of its ends to the window frame A, so that its outer surface may be flush with the exterior surface of the side of the frame A, as indicated in Fig. 1, there preferably being one such bar arranged at each side of the frame as there shown. A block $i$ is firmly attached to the other or free end of this spring bar I at its surface opposite to the one which is to be flush with the frame A, the frame being recessed so as to receive both the bar and block attached thereto, as is clearly seen in Fig. 9. This permits of this bar and block being forced back into this recess, as $i'$, by the replacing of the casing for that side of the window frame and for it to remain in such recess until it is to be brought into use for holding the sash, as B', in the guideway, as seen in Fig. 9, against pressure from its side farthest from this block $i$. The spring I is so secured in position that it tends to move out of the recess and into the holding position seen in Fig. 9, whenever unrestrained by the pressure of casing, as D, in its normal position. When this casing is put in place and secured in position the contact of the casing with the spring bar I forces the bar and its block into recess $i'$ and holds it there, out of holding position, until such casing is again moved to free such bar and block. When this bar and block are in the recess, as seen in Fig. 1, the sash, as B', is free to move in the opening and closing direction the same as if these parts were not present. Upon moving casing, as D, toward the center of the window or otherwise, so as to release the spring bar, such bar moves into position by its own resilience to engage with the sash as seen in Fig. 9. When in this position the sash is both held against movement toward such spring bar and also in the upward or opening direction by reason of the presence of such bar and block in engagement with the sash. When the bar I and block $i$ are arranged to engage with the sash, as B', as here shown, the sash is held from moving in the opening direction independently of the locking detents, as $l$, so that if for any reason they were not in locking engagement with the window frame the sash could not move into the open position when it was automatically raised in ordinary use, or if both sashes were counterbalanced, more or less, the sash, as B', could not move into the open position upon detaching the sash, as B, therefrom and relieving it from the weight of the other sash. This holding the sash from moving into the open position by these holding means is a separate function from that of holding the sash in its guideway against pressure from a direction tending to move it out of the guideway, when one sash is detached from the other, or when one sash is removed and no means is provided for holding the remaining sash therein. When the bar I and block $i$ are in the position seen in Fig. 9 they engage both with the recess $i'$ in the window frame and the recess $i^2$ in the sash and prevent the movement of the sash in the opening direction. Other forms of means than that just described may be employed to hold the remaining sash in the guideway when one sash is removed therefrom, as for instance, such as is shown in Figs. 13 and 14. Here the guideway $a^2$ is made in two parts, as it were, instead of in one as seen in Figs. 1 to 13, inclusive, the guideway being divided by a removable parting strip F, the casing, as $D^2$, being either removable or movable, as before explained, to permit of the sash, as $B^4$, being removed as is the case in preceding figures of the drawings. In Fig. 13 the casing and both sashes are seen in their normal positions while in Fig. 14 this casing and one of the sash have been removed. An examination of these two figures will make plain how sash, as $B^5$, is held in position against pressure from either side of it. If this sash, as $B^5$, is, for any reason to be removed from the guideway as $a^2$, it can be readily done by simply removing this parting strip, as F, in a well known manner. The sashes, as $B^4$ and $B^5$, coact with the guideway, as $a^2$, in the same manner that the sashes, as B and B' coact with their guideway, as $a$, and the presence of this parting strip, as F, does not in any way interfere with or modify their coacting relations. The function of this strip, as F, in the combinations of elements or devices is to hold the remaining sash, as $B^5$, in the guideway when the other sash, as $B^4$, is removed therefrom and it is in position to serve this function whenever the removal of one sash requires that such function shall be served.

Instead of connecting the automatic raising or counterbalancing means to the sash, as seen in Figs. 15 and 16 such means may be connected in any desired manner, as for instance as seen in Figs. 17 and 18, or otherwise as desired. Also instead of connecting the sashes together by means of the bar C, wedge or inclined surfaces and studs or coacting surfaces, as seen in Figs. 1 to 12 of the drawings, and wherein a double or two functions are served by one form of means this result may be accomplished by two distinct and separately acting means, as shown in Figs. 17 to 20, inclusive, or otherwise as desired. As shown in these Figs. 17 to 20 the sashes are connected together so as to move substantially as a single sash moves in opening and closing the window by pins or projections, as $h$, securely attached to one sash, as $B^6$, which enter suitable recesses, as $h'$, in the other sash, as $B^7$, as is clearly seen in Fig. 19. The number of these pins and recesses, as $h$ and $h'$, respectively, may be such as the constructor sees fit to employ in order to do this work. Two will be sufficient, it is thought, preferably placed near the edges of the sashes, as indicated in these Figs. 17, 18 and 19. As thus used the sashes are connected together so that they necessarily move together, and also so that that which supports one sash necessarily supports the other one. Also so that force applied to one sash tending to move it in the opening, closing or any other direction is transmitted to the other sash with substantially like effect. As shown in these Figs. 17 to 20, inclusive, the means by which the sashes are moved to bring them into firm contact with the guideway coact with both sashes to substantially an equal extent. These sash moving means consist of a bar, as $C^4$, which is provided with double or twin wedging or inclined surfaces, as $c^6$, $c^7$ and $c^8$, one of each pair coacting with suitable surfaces on one sash and the other one of such pairs coacting with corresponding surfaces on the other sash, as is clearly shown in Fig. 18. These surfaces mounted on the sashes with which these twin wedge surfaces, as $c^6$, $c^7$ and $c^8$, coact are here shown in the form of rollers suitably mounted thereon, as is clearly seen in Fig. 22, wherein rollers, as $c^{10}$ and $c^{11}$, are mounted on the sashes, roller $c^{10}$ being mounted on sash $B^6$ and roller $c^{11}$ being mounted on sash $B^7$. The bar $C^4$ with the twin wedge surfaces is not shown in Fig. 22, but it is seen in Figs. 19 and 20 and partly in cross section. As shown twin surfaces $c^6$ coact with roller surfaces $c^{10}$ and $c^{11}$, twin surfaces $c^7$ coact with rollers $c^{12}$ and $c^{13}$ and wedge surfaces $c^8$ coact with roller surfaces $c^{14}$ and $c^{15}$, and so on, as desired. As these bars, as $C^4$, (one near each side of the window,) move toward spring roller R' these twin wedge surfaces engage with their respective roller surfaces and sash $B^6$ is forced away from sash $B^7$ and both sashes are forced into firm contact with the portions of the window frame $A^3$ composing the guideway, as $a^3$, in which such sashes move in opening and closing the window. These bars, as $C^4$, as here shown, are more or less placed in the recesses, as $C^5$ and $C^6$, portions of which are seen near the lower portion of Fig. 18, recess $C^5$ being formed in sash $B^6$ and recess $C^6$ being formed in sash $B^7$, so as to permit the twin wedge surfaces thereon to properly coact with the roller surfaces on the sashes. These roller surfaces, as $c^{10}$ and $c^{11}$ are clearly seen in Fig. 22, where they are shown on a larger scale than in preceding figures. The bars, as $C^4$, are connected, at the upper ends, by chains, as $r^6$, to roller $R'$, so that the tension of the spring in this roller $R'$ is exerted on these bars and through the operating means to the sashes, when the window is being opened and closed. At other times this stress is exerted in forcing the sashes apart, as before explained. As thus arranged the weight of the sashes resists the stress of this spring and the sashes are forced apart in proportion to the force exerted by this spring on these bars. As shown in these Figs. 17 to 20 the sashes $B^6$ and $B^7$ are under or only partially counterbalanced by the tension of the spring in the roller $R'$ and as a consequence a portion of the weight of such sashes is supported by the sill, as $b^6$, of the frame, as $A^3$, as indicated in Fig. 18, when the window is closed. The tension of this spring in roller $R'$, of course, is exerted to support the remaining portions of the weight of such sashes, and when one is to open the window only the weight not supported or carried by such spring has to be overcome by the force exerted through the hands of such person and the operating means, as $O^4$, it being understood that preferably one such means will be provided near each of the opposite sides of the window, so that there may be one such means for each hand of the person who wishes to open the window. These operating means are quite similar to those seen in preceding figures and operate in substantially the same manner when the window is to be opened. These means are provided with a pivoted lever, as $o^{40}$, which is pivoted to sash $B^6$, as seen, and it is provided with an abutting piece, as $o^8$, which abuts against a portion of the thumb or hand piece, as $o^7$, when such lever is moved in the act of opening the window and prevents further movement of such lever in that direction. The inner end of this lever, as $o^{40}$, engages with a projection or roller, as $x$, attached to bar, as $C^4$, as seen in the lower portion of Fig. 18. When this lever, as $o^{40}$, is moved in the act of opening the window such movement causes bar $C^4$ to be moved toward sill $b^6$ and this moves each of the twin wedge surfaces away from their respective coacting surfaces and as a result both sashes are released from a firm or holding contact with the guideway and the continued application of force to lever, as $o^{40}$, will overcome the non-counterbalanced weight of the sashes and they may be moved in the opening direction as desired. Any desired form or construction of locking means may be employed to hold the sashes in the open position or to hold them in the closed position, as will be manifest to those skilled in this art. I have shown and described one form in connection with preceding figures of the drawings, but other forms than this one may be used, if desired. The sashes may be under balanced, as before explained, fully counterbalanced or over balanced as the constructor sees fit. If the sashes be underbalanced, so as to remain in the closed position in use, then some means would be necessary to hold them in the open position. If they be fully counterbalanced or over balanced then such means would not be needed, as the sashes would be supported in the open position by the balancing means. If locking means be required to hold the sashes in the open position then such means would only need to be manipulated into the unlocked condition in order for the sashes to return to the closed position by gravity acting thereon. Instead of connecting the counterbalancing means to these bars, as $C^4$, as seen in Figs. 17 and 18, such means may be connected directly to one of the sashes as in Figs. 15 and 16, or as seen in Figs. 26 and 27, or otherwise as desired.

In Figs. 26 and 27 the spring roller $R^2$ is connected directly to sash $B^9$ by cords or other means, as $r^8$ and $r^9$, and the tension or stress of the spring in this roller $R^2$ may be such as to under balance, counterbalance or over balance the weight of sashes $B^8$ and $B^9$, as desired. As thus shown in Figs. 26 and 27 bars, as $C^8$, similar to bars $C^4$ in Figs. 17 and 18, are employed each having twin wedge surfaces, as $c^{16}$ and $c^{17}$, which coact with similar roller surfaces, as $c^{20}$, $c^{21}$, $c^{22}$ and $c^{23}$, to those seen in said Figs. 17 and 18 and the coaction of these several surfaces is with like result of forcing the sashes $B^8$ and $B^9$ apart, as in the case of sashes $B^6$ and $B^7$ of Figs. 17 and 18. These sashes $B^8$ and $B^9$ are shown connected in a manner similar to that by which sashes $B^6$ and $B^7$ are connected together, so as to move together by the movement of one of them. As shown pins or projections, as $h^2$, are secured to sash $B^9$ and enter and engage with recesses, as $h^3$, in sash $B^8$, as is clearly seen in Fig. 27. Thus when sash $B^8$ is moved sash $B^9$ necessarily goes with it and the two move substantially as a single sash moves, but one sash may move to or from the other. Also sash $B^8$ is supported by sash $B^9$ when both sashes are counter or over balanced by roller $R^2$. Also force applied to one sash may be transmitted to the other one. Instead of the balancing means exerting its force to move the sashes $B^8$ and $B^9$ apart and into firm contact with the guideway $a^4$ of frame $A^4$, as in Figs. 17 and 18, such sashes are forced apart by means of a two arm spring $S$ mounted on sash $B^9$, one arm, as $s$, engaging with the upper end of bar, as $C^8$, and the other one, as $s'$, engaging with the other bar, as $C^9$, as is clearly shown in Figs. 26 and 27. This spring S is arranged so that its arms exert their stress or tension to move the bars, as $C^8$, $C^9$, in a direction for the twin wedge surfaces to coact with their respective coacting surfaces and move sashes $B^8$ and $B^9$ apart, as sashes $B^6$ and $B^7$ are moved apart by the force of the spring in roller $R'$ applied to bars, as $C^4$, as before explained, the action of the bars and their coacting surfaces on the sashes being the same in both cases. The stress or tension of this spring, as S, on the bars, as $C^8$ and $C^9$, may be such as is desired to force the sashes apart and in the act of opening the window it is only the stress of this spring which has to be overcome by the operating means, which may be substantially the same as in Figs. 17 and 18, as shown in Figs. 26 and 27. These operating means, as $O^8$, have a thumb or hand piece, as $o^{11}$, fixed rigidly to the sash $B^8$ and a pivoted lever, as $o^{10}$, the same as the means $O^4$ seen in Figs. 17 and 18. This pivoted lever engages with a projection on bars, as $C^8$ and $C^9$, in a manner similar to that in which this is done in the construction seen in those figures. It will thus be observed that the force required to operate the pivoted levers, as $o^{10}$, of these operating means, as $O^8$, is not changed by any change in the force which under, counter or over balances the weight of sashes $B^8$ and $B^9$. This is an advantage when sashes above the medium weight are to be more or less counterbalanced. If the sashes are over balanced so as to automatically open the window when once released the entire balancing force does not need to be overcome in order to move the bars, as $C^8$ and $C^9$, to release the sashes from their firm contact with the guideway, as $a^4$, in frame, as $A^6$, as would be the case if such balancing force was applied as in the case in the construction seen in Figs. 17 and 18.

Instead of connecting the sashes together and employing the means to move the sashes, one relatively to the other, in the guideway as heretofore shown the means seen in Fig. 28 may be employed. In this case as in the construction set forth in Figs. 1 to 12 the sash moving means serve two functions of connecting the sashes together and of moving one relatively to the other to bring both sashes into firm contact with the guideway and to release them from such contact.

As shown in Fig. 28 sashes $B^{10}$ and $B^{11}$ are connected together by links or bars, as $C^{10}$, $C^{11}$ and $C^{12}$, one end of each being pivoted to sash $B^{10}$ and the opposite end of each being pivoted to sash $B^{11}$. When the sashes are connected together in the manner as here seen sash $B^{10}$ has only a limited movement relatively to sash $B^{11}$ in the guideway, owing to the fact that links, as $C^{10}$, $C^{11}$ and $C^{12}$, move in arcs of circles so that as sash $B^{10}$ is moved in the opening direction and relatively to sash $B^{11}$, by the operating means, as $O^{10}$, it is moved toward the latter sash until the two contact or are otherwise limited in their movement, and then when sash $B^{11}$ rests upon the sill, as $b^{10}$, the weight of the sash $B^{10}$ forces both sashes into firm or holding contact with the guideway. When sash $B^{10}$ has moved toward sash $B^{11}$ so as to contact therewith further movement in that direction cannot take place and hence on the continued application of force to the operating means, as $O^{10}$, both sashes must be moved in the opening direction to the desired extent, where they may be held by any desired means. When the window is to be closed, and links $C^{10}$, $C^{11}$ and $C^{12}$ are arranged, as shown in Fig. 28 the pivoted lever, as $o^{20}$, has to be moved toward thumb or hand piece, as $o^{21}$, and sash $B^{10}$ moved toward sash $B^{11}$, so as to release both sashes from binding or holding contact with the guideway and the two sashes allowed to move in the closing direction until sash $B^{11}$ rests upon sill $b^{10}$, then upon releasing lever, as $o^{20}$, the sashes will be forced apart by the weight of sash $B^{10}$ acting on sash $B^{11}$ through links or bars, as $C^{10}$, $C^{11}$ and $C^{12}$. From this it will be seen that these links not only connect the sashes together, but also serve to move one sash relatively to the other one to bring them into and out of firm contact with the guideway. In this respect the sash moving means seen in Fig. 28 are similar to the sash moving means shown in Figs. 1, 2, 15 and 16 of the drawings, but they differ in that in Fig. 28 one sash is not as readily detached from the other as is the case in the construction seen in such preceding figures.

In each of the constructions herein shown and described one sash is so connected to the other as to be movable relatively thereto for the purpose of not only bringing both sashes into and out of firm and close contact with the guideway, but also to cause both sashes to move substantially as a single sash moves in opening and closing the window. Also in each case there are sash moving means provided whereby the sashes are moved into and out of firm contact with the guideway. Also in each case one sash affords a support for the other and one sash is more or less carried by the other. Also in each case both sashes are tightly held in the guideway, when the window is not to be opened or closed, and yet, when it is desired to move the sashes in the guideway, by simply manipulating the operating means both are substantially free to move therein, through the operation of the sash moving means. Also in each case, when sash balancing means are employed, such means coöperate with the sash operating, sash moving and connecting means in bringing the sashes into and out of firm contact with the guideway, whether the sash moving and connecting means are in the form to serve both functions, (one of moving one sash relatively to the other, and one of connecting the sashes together, so as to move as a single sash moves in opening and closing the window,) or in distinct and separate forms, one of which serves one function and the other serves the other function.

It is to be observed that the sash balancing, the sash moving, the sash connecting, sash operating and dirt excluding and air confining means coöperate, one with the other, and all together, in producing a tight, easily opened and clean double sash window. Also that the movable casings, the sash balancing, the sash moving, sash operating, sash locking and dirt excluding and air confining means all coöperate together and with one another in producing a tight, easily opened, clean and readily accessible double sash window.

What is herein shown and described will naturally suggest to the minds of those skilled in this art other specific embodiments of this invention, and also modifications in the construction and arrangements of parts, wherein substantially the same result will be accomplished by combinations of elements or devices having essentially the same mode of operation as the combinations have that are particularly pointed out in the claims hereunto annexed, hence I do not wish to limit my invention to the specific forms and arrangements herein set forth, but desire to include all forms and arrangements which embody the spirit of my invention and which have substantially the same mode of operation as do the specific parts and arrangements of the same that are herein shown and described.

The term "sash balancing means" used in the claims hereunto annexed is intended to include all forms of means which operate to under, over or counter balance the weight of one or both of the sashes accordingly as the constructor sees fit to organize his structure.

What I claim as new is:—

1. In a window the combination, substantially as set forth, of a guideway, two sashes adapted to move and be held therein, one in front of the other, and means adapted to move the sashes, one relatively to the other, into contact with the guideway and obstruct the passage of air and dirt around the edges of the sashes.

2. In a window the combination, substantially as set forth, of a guideway, two sashes adapted to move and be held therein, one in front of the other, and means adapted to move the sashes, one relatively to the other, into contact with different portions of the guideway and by such contact obstruct the passage of air and dirt around the edges of the sashes.

3. In a window the combination, substantially as set forth, of a guideway, two sashes adapted to move and be held therein, one in front of the other, and means connecting with the sashes and adapted to move one sash relatively to the other in the guideway to hold the sashes tightly therein.

4. In a window the combination, substantially as set forth, of a guideway, two sashes adapted to move and be held therein, one in front of the other, and wedging means connected therewith and adapted to force the sashes into contact with the guideway to obstruct the passage of air and dirt between the sashes and guideway.

5. In a window the combination, substantially as set forth, of a guideway, two sashes adapted to move and be held therein, one in front of the other, and means connected with the sashes, a portion of which is movable relatively to another portion and when moved in one direction moves one of the sashes relatively to the other to hold them in their guideway and when moved in another direction releases the sashes and leaves them substantially free to be moved in such guideway.

6. In a window the combination, substantially as set forth, of a guideway, two sashes connected together and movable in the guideway to open and close the window substantially as a single sash is movable, and means a portion of which is movable and when moved in one direction holds both sashes tightly in the guideway and when moved in another direction permits them to be moved therein.

7. In a window the combination, substantially as set forth, of a guideway, two sashes movable therein, means provided with wedge and coacting surfaces arranged to move one sash relatively to the other to bring them into and out of firm contact with the guideway, and means adapted to support the sashes and permit them to be moved, whereby, the movement of the wedge surfaces in one direction moves both sashes into substantially equal firm contact with the guideway.

8. In a window the combination, substantially as set forth, of a guideway, two sashes movable therein, means adapted to act on both sashes and force them away from each other, and means adapted to support the sashes and permit them to be forced apart, whereby, both sashes are forced away from each other and are held in contact with the guideway.

9. In a window the combination, substantially as set forth, of a guideway, two sashes movable therein, means provided with wedge and coacting surfaces arranged to force each sash from the other, and means adapted to support the sashes and permit them to be forced apart, whereby, the movement of the wedge surfaces in one direction causes the sashes to separate and be equally held in contact with the guideway.

10. In a window the combination, substantially as set forth, of a guideway, two sashes movable therein, one of which is normally supported and the other is normally carried thereby, aided by the restraint of the guideway thereon, and sash moving means acting on both sashes and adapted to move one relatively to the other, whereby, both sashes are moved and held in contact with the guideway by the sash moving means and the carrying of one sash by the other.

11. In a window the combination, substantially as set forth, of a guideway, two sashes movable therein, sash moving means adapted to move one sash relatively to the other, and means connecting the sashes together and adapted to permit of their being moved, whereby, gravity causes the moving means to move one sash relatively to the other and force them into contact with the guideway.

12. In a window the combination, substantially as set forth, of a guideway, two sashes movable therein, sash moving means, and means connecting the sashes together and providing a support against which a portion of the sash moving means may act and move one sash relatively to the other, whereby, both sashes are moved into contact with the guideway.

13. In a window the combination, substantially as set forth, of a guideway, two sashes movable therein, sash moving means, and sash supporting means operative upon a portion of the sash moving means, whereby, both sashes are forced into contact with the guideway by the action of such supporting means upon such moving means.

14. In a window the combination, substantially as set forth, of a guideway, two sashes movable therein, means adapted to act on both sashes at opposite sides thereof, and sash supporting means, whereby, both sashes are forced into contact with the guideway by the action of the supporting means upon the acting means.

15. In a window the combination, substantially as set forth, of a guideway, two sashes movable therein, sash moving devices arranged and adapted to act on both sashes at opposite sides of the window, and sash supporting means, whereby, both sashes are forced apart and into contact with the guideway by the operation of such sash moving devices.

16. In a window the combination, substantially as set forth, of a guideway, two sashes movable therein, sash moving devices provided with wedge and coacting surfaces and arranged at opposite sides of the window, and sash supporting means, whereby, both sashes are moved, one relatively to the other, into contact with the guideway by the operation of such wedge and coacting surfaces.

17. In a window the combination, substantially as set forth, of a guideway, two sashes movable therein, sash moving means, and normally acting means arranged in connection with the sash moving means, whereby, both sashes are normally forced into contact with the guideway by the action of the normally acting means upon the sash moving means.

18. In a window the combination, substantially as set forth, of a guideway, two sashes movable therein, sash moving means, and a spring normally under tension, whereby, both sashes are normally forced into contact with the guideway by the action of the spring upon the sash moving means.

19. In a window the combination, substantially as set forth, of a guideway, two sashes movable therein, sash moving means, and a two arm spring, one arm engaged with such means near one side of the window and the other engaged with such means at the other side, whereby, both sashes are normally forced into contact with the guideway by the action of the spring upon the sash moving means.

20. In a window the combination, substantially as set forth, of a guideway, two sashes movable therein, means adapted to act on both sashes and move them into contact with the guideway, means adapted to support the sashes and permit one to be moved relatively to the other, and means adapted to move one sash relatively to the other to release them from holding contact with such guideway.

21. In a window the combination, substantially as set forth, of a guideway, two sashes movable therein, means adapted to act on both sashes and move them into contact with the guideway, means adapted to support the sashes and permit one to be moved relatively to the other, and locking means attached to one of the sashes and adapted to hold the sashes in the closed position.

22. In a window the combination, substantially as set forth, of a guideway, two sashes movable therein, means adapted to act on both sashes and move them into contact with the guideway, means adapted to support the sashes and permit one to be moved relatively to the other, locking means, and means adapted to move one sash relatively to the other to release them in the guideway and also adapted to operate the locking means, whereby, the sashes are unlocked and released from the holding contact of the guideway upon operating the releasing means.

23. In a window the combination, substantially as set forth, of a guideway, two sashes movable therein, sash moving means adapted to move one sash relatively to the other, and means adapted to detachably connect the sashes together, whereby the sashes move in their guideway substantially as a single sash moves in opening and closing the window and one sash is detachable from the other when unconfined by the guideway.

24. In a window the combination, substantially as set forth, of a guideway, two sashes movable therein, sash moving means adapted to move one sash relatively to the other, and means adapted to connect the sashes together when moving and maintain the connection when unconfined by the guideway until one sash is caused to be moved relatively to the other.

25. In a window the combination, substantially as set forth, of a guideway, two sashes movable therein, sash moving means, and operating means, whereby, one of the sashes is moved relatively to the other by the action of the sash moving means thereon and is moved in the reverse direction by the operating means in closing and opening the window.

26. In a window the combination, substantially as set forth, of a guideway, two sashes movable therein, sash moving means, operating means, and means a portion of which is connected with one sash and engages with a portion of the other sash, whereby, the movement of one sash by the operating means is limited by the engagement of such portions in opening the window.

27. In a window the combination, substantially as set forth, of a guideway, two sashes movable therein, sash moving means adapted to move one sash relatively to the other, means adapted upon the movement of one sash to correspondingly move the other to open and close the window and permit of detaching one sash from the other, and means adapted to hold the remaining sash against displacement from substantially its closed position in the guideway.

28. In a window the combination substantially as set forth, of a guideway a portion of which is movable, two sashes movable therein, means adapted upon the movement of one sash to correspondingly move the other to open and close the window and permit of detaching one sash from the other, and automatic locking means adapted to be brought into locking position by the movement of a portion of the guideway and lock the remaining sash against movement in the opening and closing direction.

29. In a window the combination, substantially as set forth, of a guideway a portion of which is movable, two sashes movable therein, sash moving means adapted to move one sash relatively to the other and to permit of one being detached from the other, means adapted upon the movement of one sash to correspondingly move the other to open and close the window, and means adapted to hold one sash against displacement when the other is removed from the guideway.

30. In a window the combination, substantially as set forth, of a guideway, two sashes movable therein to open and close the window, substantially as a single sash is movable, means connecting the two sashes together, one portion of which is fixedly attached to one sash and the other is similarly attached to the other and one sash being movable relatively to the other to force both sashes into contact with the guideway.

31. In a window the combination, substantially as set forth, of a guideway, two sashes movable therein to open and close the window, means a portion of which connects with portions mounted on both sashes to move one relatively to the other sash and also connects with sash balancing means, and sash balancing means, whereby, both sashes are more or less balanced and forced into firm contact with the guideway through the action of such balancing means on such portion.

32. In a window the combination, substantially as set forth, of a guideway, two sashes movable therein, means adapted to connect the sashes together and cause the two to move together in opening and closing the window, and sash balancing means, whereby, both sashes are more or less balanced and each sash is moved relatively to the other and both are held in contact with the guideway.

33. In a window the combination, substantially as set forth, of a guideway, two sashes connected together and movable in the guideway to open and close the window, sash balancing means connected to one of the sashes and adapted to more or less balance both of them, and means adapted to move one of such sashes relatively to the other and hold them tightly in the guideway.

34. In a window the combination, substantially as set forth, of a guideway, two sashes movable therein, sash moving means adapted to connect the sashes together and also move one relatively to the other, and sash balancing means connecting with one sash and adapted to actuate the sash moving means and also to more or less balance both sashes.

35. In a window the combination, substantially as set forth, of a guideway, two sashes movable therein, sash moving means adapted to move one sash relatively to the other, sash balancing means adapted to more or less balance both sashes, and means connecting the sashes together, whereby the sashes are more or less balanced and moved into contact with their guideway.

36. In a window the combination, substantially as set forth, of a guideway, two sashes movable therein sash moving means adapted to move one sash relatively to the other to force them into contact with the guideway, a portion of which is movable relatively to both sashes and is adapted to connect with sash balancing means, and sash balancing means adapted to connect with such portion and more or less balance both sashes.

37. In a window the combination, substantially as set forth, of a guideway, two sashes movable in the guideway, sash moving means adapted to move one sash relatively to the other to force them into contact with the guideway, and means adapted to support one sash through its connection with the other and thereby permit the sash moving means to operate and force both sashes into contact with the guideway.

38. In a window the combination, substantially as set forth, of a guideway, two sashes movable in the guideway, sash moving means adapted to move one sash relatively to the other to force them into contact with the guideway, and means adapted to support one sash by being attached thereto and also to more or less support the other sash by its connection therewith and permit one sash to move relatively to the other.

39. In a window the combination, substantially as set forth, of a guideway, two sashes movable in the guideway, sash moving means adapted to move one sash relatively to the other, and means adapted to more or less confine the air between the sashes in the differing positions they assume, one relatively to the other.

40. In a window the combination, substantially as set forth, of a guideway, two sashes movable in the guideway, sash moving means adapted to move one sash relatively to the other, and means interposed between the sashes adapted to more or less confine the air between the sashes in their movement by the sash moving means.

41. In a window the combination, substantially as set forth, of a guideway, two sashes movable in the guideway, sash moving means adapted to move one sash relatively to the other, and means adapted to permit of the passage of a limited amount of air therethrough and to substantially exclude the fine particles of dust from the glass space between the sashes.

42. In a window the combination, substantially as set forth, of a guideway, two sashes movable in the guideway, sash moving means adapted to move one sash relatively to the other, and means, a portion of which is attached to one sash and is spring-pressed against the other sash, which means is thereby adapted to more or less confine the air between the sashes in their movement by the sash moving means.

43. In a window the combination, substantially as set forth, of a guideway, two sashes movable in the guideway, sash moving means adapted to move one sash relatively to the other, and means adapted to contact with both sashes and yield as the sashes move relatively to one another, thereby excluding dust from the space between them.

44. In a window the combination, substantially as set forth, of a guideway, two sashes movable therein, sash moving means adapted to move one sash relatively to the other, a continuous piece of flexible material arranged to contact with both sashes and inclose a space between them, and means adapted to yieldingly hold such material in such contact as the sashes move, one relatively to the other.

OLIVER M. EDWARDS.

Witnesses:
EDNA LADD,
FRANK D. DEUEL.